(12) United States Patent
Powers et al.

(10) Patent No.: US 7,924,874 B2
(45) Date of Patent: Apr. 12, 2011

(54) EVALUATING AND ALLOCATING SYSTEM RESOURCES TO IMPROVE RESOURCE UTILIZATION

(75) Inventors: Jason Dean Powers, Santa Monica, CA (US); Evan Kirshenbaum, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2996 days.

(21) Appl. No.: 10/387,148

(22) Filed: Mar. 11, 2003

(65) Prior Publication Data

US 2004/0179528 A1 Sep. 16, 2004

(51) Int. Cl.
*H04J 3/16* (2006.01)
(52) U.S. Cl. ............ 370/468; 370/235; 370/395.4; 709/226
(58) Field of Classification Search .......... 370/230, 370/230.1, 231, 232, 235, 378, 379, 381, 370/382, 395.4, 468; 709/213–216, 226; 711/170–173; 703/22
See application file for complete search history.

(56) References Cited

U.S. PATENT DOCUMENTS

| | | | | |
|---|---|---|---|---|
| 5,933,490 A * | 8/1999 | White et al. | ............. | 379/221.01 |
| 6,011,909 A * | 1/2000 | Newlin et al. | ................. | 709/227 |
| 6,366,668 B1 * | 4/2002 | Borst et al. | ............... | 379/266.04 |
| 6,570,855 B1 * | 5/2003 | Kung et al. | .................... | 370/237 |
| 6,865,150 B1 * | 3/2005 | Perkins et al. | ................ | 370/230 |
| 6,912,392 B2 * | 6/2005 | Setty | .............................. | 455/445 |
| 6,973,622 B1 * | 12/2005 | Rappaport et al. | ............ | 715/735 |
| 7,085,829 B2 * | 8/2006 | Wu et al. | ........................ | 709/223 |
| 2003/0225563 A1 * | 12/2003 | Gonos | ............................. | 703/22 |
| 2003/0229695 A1 * | 12/2003 | Mc Bride | ...................... | 709/224 |

FOREIGN PATENT DOCUMENTS

EP 881808 A2 * 12/1998
WO WO 0117183 A1 * 3/2001

OTHER PUBLICATIONS

Haraha, H. et al., "Dynamic Home Node Reallocation on Software Distributed Shared Memory," The Fourth Internation Conference/Exhibition on High Performance Computing in Asia-Pacific Region, May 14-17, 2000, vol. 1, pp. 158-163.*

* cited by examiner

*Primary Examiner* — Donald Mills

(57) ABSTRACT

Methods and systems for evaluating the utilization of resources in a system. Information that characterizes an allocation of resources in the system is received. Information that characterizes requests to the system is also received. Workflow in the system in response to the requests is simulated. Processes that are executed by the system in response to the requests are also simulated. Utilization of the allocation of resources is determined. The resources can be reallocated to improve the utilization as measured against a selected performance metric.

32 Claims, 4 Drawing Sheets

400

```
┌─────────────────────────────┐
│  RECEIVE INFORMATION        │
│  CHARACTERIZING RESOURCE    │
│  ALLOCATION OF THE SYSTEM   │
│            410              │
└─────────────────────────────┘
              │
              ▼
┌─────────────────────────────┐
│  RECEIVE INFORMATION        │
│  CHARACTERIZING REQUESTS    │
│       TO THE SYSTEM         │
│            420              │
└─────────────────────────────┘
              │
              ▼
┌─────────────────────────────┐
│     SIMULATE WORKFLOW       │
│        IN THE SYSTEM        │
│            430              │
└─────────────────────────────┘
              │
              ▼
┌─────────────────────────────┐
│   SIMULATE PROCESSES        │
│  EXECUTED BY THE SYSTEM     │
│            440              │
└─────────────────────────────┘
              │
              ▼
┌─────────────────────────────┐
│   DETERMINE UTILIZATION OF  │
│    THE SYSTEM RESOURCES     │
│            450              │
└─────────────────────────────┘
              │
              ▼
┌─────────────────────────────┐
│  REALLOCATE RESOURCES TO    │
│    IMPROVE UTILIZATION      │
│            460              │
└─────────────────────────────┘
```

EVALUATING AND ALLOCATING SYSTEM RESOURCES TO IMPROVE RESOURCE UTILIZATION

TECHNICAL FIELD

Embodiments of the present invention generally relate to the allocation of resources (e.g., computers, storage devices, etc.) in systems that provide services.

BACKGROUND ART

A system can include a number of different types of resources. The types of resources that make up a system include, at one level, computer systems, storage devices and the like, as well as devices that are used to connect them (e.g., networking devices, etc.). At another level, a system can include the processor(s), memory and the like that typically constitute a single computer system.

Systems such as these are used in a variety of applications. A system may be used for a Web-based service such as an e-commerce site, or it may constitute some portion of a server farm or the like. The system may be owned by the business enterprise that uses the resources, or the resources may be leased to another business enterprise for their use.

When configuring a system, there are tradeoffs of cost versus performance. With an increase in cost, there is usually a corresponding increase in performance.

Costs can be balanced by maximizing system utilization. In other words, costs can be justified if the system is utilized to its fullest extent at least some of the time. If a system is provisioned with resources that end up not being used, this generally means that the cost of the system is not justified.

Accordingly, it is important for a system designer or operator to know the expected system workload in order to design a system to match. However, in the prior art, the tools available for evaluating the expected system workload do not allow the designer or operator to accurately forecast the type and amount of system resources that will be needed.

Because a system will perform inadequately without sufficient resources, the tendency is to overprovision a system, then either sell off unheeded resources or find some other use for them. This can increase costs unnecessarily, because it is unlikely that all costs can be recovered in the event of a sale, and because maintenance costs remain for surplus equipment.

Accordingly, a system design tool that enables designers and operators to more precisely provision a system would be useful. Such a design tool could alleviate the problems described above, and thus would provide an improvement over the prior art.

DISCLOSURE OF THE INVENTION

Embodiments of the present invention pertain to methods and systems for evaluating the utilization of resources in a system. Information that characterizes an allocation of resources in the system is received. Information that characterizes requests to the system is also received. Workflow in the system in response to the requests is simulated. Processes that are executed by the system in response to the requests are also simulated. Utilization of the allocation of resources is determined. The resources can be reallocated to improve the utilization as measured against a selected performance metric.

BRIEF DESCRIPTION OF THE DRAWINGS

The accompanying drawings, which are incorporated in and form a part of this specification, illustrate embodiments of the invention and, together with the description, serve to explain the principles of the invention. The drawings referred to in this description should not be understood as being drawn to scale except if specifically noted.

FIG. 4 is a flowchart of a process for evaluating the utilization of resources in a system in accordance with one embodiment of the present invention.

DETAILED DESCRIPTION OF THE INVENTION

Reference will now be made in detail to the various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. In other instances, well-known methods, procedures, components, and circuits have not been described in detail as not to unnecessarily obscure aspects of the present invention.

Aspects of the present invention may be practiced on a computer system that includes, in general, a processor for processing information and instructions, random access (volatile) memory (RAM) for storing information and instructions, read-only (non-volatile) memory (ROM) for storing static information and instructions, a data storage device such as a magnetic or optical disk and disk drive for storing information and instructions, an optional user output device such as a display device (e.g., a monitor) for displaying information to the computer user, an optional user input device including alphanumeric and function keys (e.g., a keyboard) for communicating information and command selections to the processor, and an optional user input device such as a cursor control device (e.g., a mouse) for communicating user input information and command selections to the processor.

Figure 1:
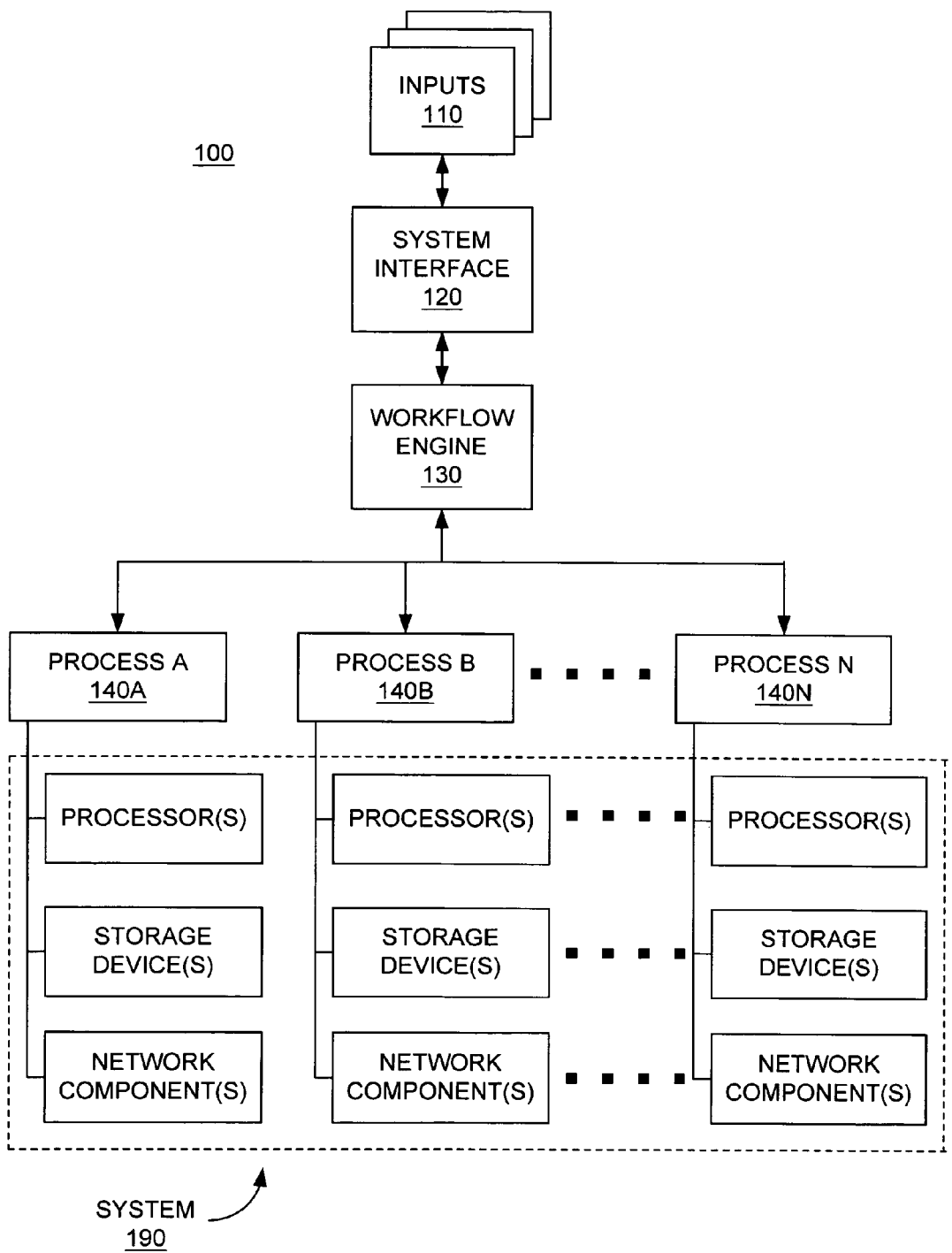
FIG. 1 is a block diagram of an exemplary architecture with which embodiments of the present invention may be utilized.

FIG. 1 is a block diagram of an exemplary architecture 100 that can be utilized with embodiments of the present invention. Embodiments of the present invention are directed to a tool for evaluating the workload generated by a software architecture, for provisioning a system with satisfactory resources to handle the workload, and for allocating those resources to the various components (e.g., processes, tasks, etc.) of the architecture. As such, it is recognized that architecture 100 represents only one example of an architecture to which the embodiments of the present invention can be applied. It is understood that elements illustrated separately in FIG. 1 may be combined into a single element, and vice versa. It is also understood that elements in addition to those shown by FIG. 1 may be present.

In the present embodiment, architecture 100 is implemented in software; however, the various elements included in architecture 100 can be implemented on different hardware devices. Thus, while it may be said that architecture 100 is implemented by a single system, the definition of "system" is both broad and fluid. For instance, a system can include a single computer system (perhaps a computer system having multiple processors), or a system can include multiple computer systems. A system can include elements in addition to a computer system, such as storage devices, networking devices, and the like. In addition, the elements that constitute a system can change over time, for example, as the workload on the system increases or decreases.

In the present embodiment, inputs 110 are received at system interface 120 and forwarded to workflow engine 130. Workflow engine 130 forwards the inputs 110 to one or more of the processes 140A, 140B, . . . , 140N.

Inputs 110 represent, for example, requests received from one or more users. In general, inputs 110 represent an action or event that causes execution of architecture 100. The inputs 110 can originate locally or remotely. That is, for example, the inputs 110 can be received from a remote device (e.g., client or server) coupled to architecture 100 via a network (an intranet or the Internet). In one such embodiment, system interface 120 is a Web server. Alternatively, a user may be interfacing with a local device upon which architecture 100 (or some portion of architecture 100) resides. In one such embodiment, system interface 120 is a graphical user interface on the local device.

In the present embodiment, workflow engine 130 functions to direct the inputs 110 to the appropriate process(es) 140A, 140B, . . . , 140N. That is, a particular input (e.g., user request) may be handled by a single process, or it may be handled by more than one process functioning in parallel or sequentially. In any of these cases, the workflow engine 130 directs the request to the proper process or processes for handling.

The processes 140A, 140B, . . . , 140N can be virtually any process implemented on or by computer systems. For example, the processes 140A, 140B, . . . , 140N can be those employed by an e-commerce Web site. The processes 140A, 140B, . . . , 140N may function independently of each other, or they may interact with each other. One process may be a sub-process of another; that is, although not illustrated as such, there may be a hierarchy of processes within architecture 100. Such a hierarchy can have multiple levels.

Various hardware resources are allocated to the various processes 140A, 140B, . . . , 140N in accordance with the embodiments of the present invention. These resources are collectively referred to herein as system 190. That is, system 190 includes the resources used in support of architecture 100.

The allocation of resources in system 190 to the various processes 140A, 140B, . . . , 140N is determined using a utilization model described further in conjunction with FIG. 2, below. The resources in system 190 are illustrated in FIG. 1 as including processors, storage devices, and network components, although other types of resources may be used. Subsets of these resources can be allocated specifically to a single process (as illustrated in FIG. 1), or some or all of these resources can be shared among processes. For example, a storage device may be shared by multiple processes, with each process allocated a portion of the memory residing on the storage device. The allocation of resources can be static or dynamic.

Figure 2:
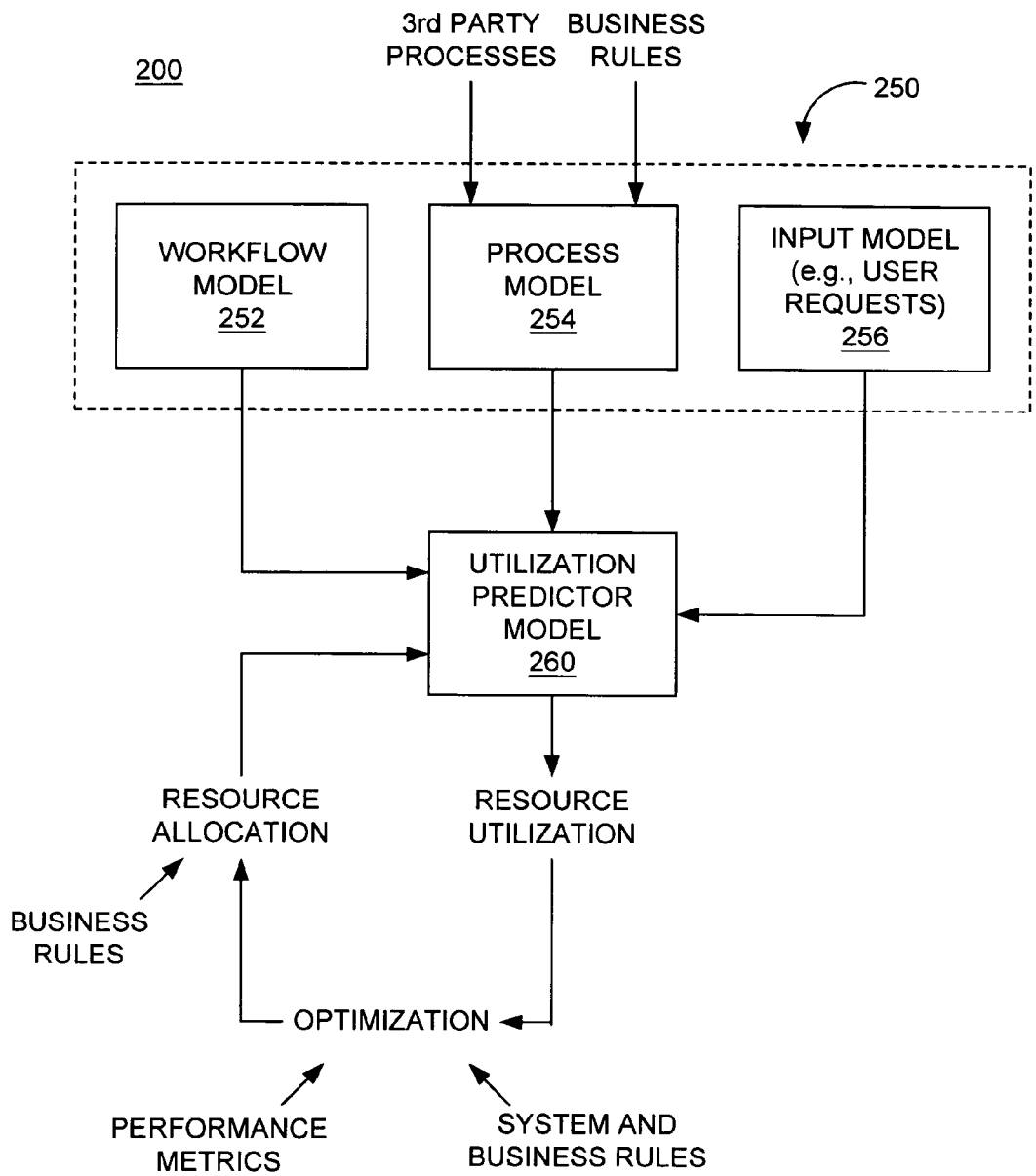
FIG. 2 is a data flow diagram showing the implementation of a utilization model in accordance with one embodiment of the present invention.

FIG. 2 is a data flow diagram 200 showing the implementation of a utilization model 250 in accordance with one embodiment of the present invention. In overview, utilization model 250 determines whether or not a system is adequately provisioned or is over-provisioned considering the workload generated by the software architecture implemented by the system. With reference also to FIG. 1, based on a mapping of inputs 110 to processes 140A, 140B, . . . , 140N, utilization model 250 determines the degree of utilization of a system 190, either during initial system design or once the system is operational. Thus, utilization model 250 can be used to facilitate initial system design, and to change the design of a system in response to changing demands on the system.

Continuing with reference to FIGS. 1 and 2, utilization model 250 can cover all of the components in system 190 or selected components. In addition, there could be a separate utilization model for each component of the system 190. In the latter case, an overall utilization model would be used to take into account the interaction between the different models/components.

In one embodiment, the utilization model 250 includes a workflow model 252, a process model 254, and a utilization predictor model 260. It is recognized that these elements may be integrated as a single module, or that they may be implemented as separate modules that interact with each other.

In one embodiment, the utilization model 250 is constructed by hand by experts. In another embodiment, the utilization model 250 is developed using analytic tools built into compilers that traverse the source code of the different components of the architecture 100 and derive the model from that. In yet another embodiment, utilization model 250 is derived by executing, or simulating the execution of, the various components of the architecture 100 using different resource allocations, and then by using machine learning techniques to regress to a single predictive model. In one more embodiment, empirical information is used to develop the utilization model 250, and can also be used to benchmark it. Other techniques can be used to construct a utilization model.

In the present embodiment, workflow model 252 models the workflow through the architecture 100. Workflow model 252 captures the specific structure of the architecture 100, and as such also captures the manner in which each of the various types of inputs 110 are handled by the architecture 100. In general, workflow model 252 maps the inputs 110 to one or more of the processes 140A, 140B, . . . , 140N.

In the present embodiment, process model 254 models the processes 140A, 140B, . . . , 140N implemented in the architecture 100. The process model 254 can include specified business rules. For example, a business rule can be used to establish a relative priority of processes 140A, 140B, . . . , 140N, perhaps allowing one process to be terminated in favor of another. Conversely, a business rule can also be used to establish that the system should be able to concurrently support all of the processes in the architecture 100. Other types of business rules can be specified as well.

In one embodiment, third party processes are also addressed by the process model 254. That is, generally speaking, process model 254 accounts for those processes that are implemented and executed by a third party, external to architecture 100, as well as those processes internal to architecture 100. Third party processes typically utilize resources outside of the system 190; however, the speed and efficiency with which the third party processes are performed can impact system performance, and hence are considered in the utilization model 250. In some instances, third party processes are covered by a service level agreement (SLA). In those instances, the terms of the SLA can be used as the basis for modeling the third party processes. In one embodiment, a model of a third party process is provided by the third party and incorporated into process model 254.

In the present embodiment, user requests (e.g., inputs 110 of FIG. 1) are modeled by input model 256. In one embodiment, input model 256 is separate from but provides input to the utilization model 250 of FIG. 2. In another embodiment, input model 256 is included in the utilization model 250.

Continuing with reference to FIGS. 1 and 2, input model 256 provides a measure of the expected input from users into the architecture 100. The expected user inputs may take the form of a statistical distribution encompassing the different types of requests, the number of requests of each type and in total, and the frequency of requests. In some instances, the level of user inputs to be supported by system 190 is governed by an SLA. In those instances, the terms of the SLA can be used as the basis for modeling the expected level of user inputs.

In the present embodiment, input to the utilization model 250 also includes information describing the resource allocation that is to be evaluated. The resource allocation information includes information that characterizes the type of system resources to be evaluated, the quantity of the resources, and their attributes and capabilities. Other types of information characterizing the resource allocation can be used. Examples of information that may be used for describing the resource allocation include, but are not limited to, the number of computers (e.g., servers) in the system, the number of processors per computer, the amount of memory available, network bandwidth, or free disk space.

Continuing with reference to FIG. 2, resource allocation information is input to the utilization model 250. The resource allocation information describes the state of system 190 that is to be evaluated. The resource allocation information can represent an assumed allocation that serves as a starting point of the evaluation. The resource allocation information can also represent resources already in use. As will be seen, the system design is an iterative process, and so the resource allocation information can also represent an intermediate state in the system design process.

Resource allocation may be subject to system rules that place constraints on the type, quantity, attributes and capabilities of the resources selected for evaluation. Other types of system rules can be specified. The system rules can be included in the utilization model 250. These rules can be enforced automatically within the utilization model 250. For example, based on the system rules, the utilization model 250 could impose default values on the system designer or system operator, provide a limited selection of options to the designer/operator, or trigger an alert (e.g., a popup screen) should a rule be violated.

According to the present embodiment, utilization predictor model 260 receives input from workflow model 252, process model 254, and input model 256, as well as information describing the resource allocation that is to be evaluated. Based on these inputs, the utilization predictor model 260 determines the degree of utilization of the resources. The degree of resource utilization can be measured as the degree of consumption of the evaluated resource allocation. Alternatively, the degree of utilization can be measured, for example, as the time to process a certain type of transaction or the expected number of missed deadlines. Utilization can also be specified as a statistical distribution, for example: "With five servers, each having 512 MB of memory, the system is expected to be typically at 35 percent of its peak capacity, and above 90 percent of peak capacity five percent of the time." It is understood that these are merely examples, and that utilization can be otherwise specified.

Once the resource utilization is determined, the allocation of resources can be optimized relative to one or more performance metrics. The performance metrics can include those mentioned in the preceding paragraph. Other types of performance metrics can include system cost and system downtime. It is understood that the performance metrics are not limited to these examples.

During optimization of the resource allocation, the measure of resource utilization can be compared against selected performance metrics. Optimization techniques such as linear programming can be used. The resource allocation can be adjusted by reallocating resources, by adding new resources, and/or by eliminating resources considered unnecessary. System and business rules that might constrain resource allocation can be imposed at this point. The resultant (new) resource allocation can then be evaluated using utilization predictor model 260. As mentioned, system design is an iterative process, and therefore evaluations using the utilization model 250 can continue until a satisfactory design, as measured against the performance metrics, is achieved.

The utilization model 250 and the utilization predictor model 260 can also be used to evaluate the risks and consequences of changing to a different resource allocation. Different resource allocations can be evaluated independently, with the results provided to the system designer/operator as recommendations that highlight the associated consequences and risks of each. For example, for each resource allocation evaluated, the recommendations can describe the capability to process certain types of transactions, or the impact on transactions currently being processed. The risks and consequences can be derived from the utilization predictor model 260 within the framework illustrated by FIG. 2, or using a separate risk/consequence engine coupled to the utilization predictor model 260. The recommendations provide information that allows the system designer or operator to make an informed decision regarding a change in resource allocation and the selection of a new (different) resource allocation. Alternatively, these decisions can be made automatically based on specified system and business rules.

In one embodiment, the utilization model 250 can include a reporting module, which generates graphs, provides statistics, and reports trends in a user-friendly format to assist in the optimization effort.

Figure 3:
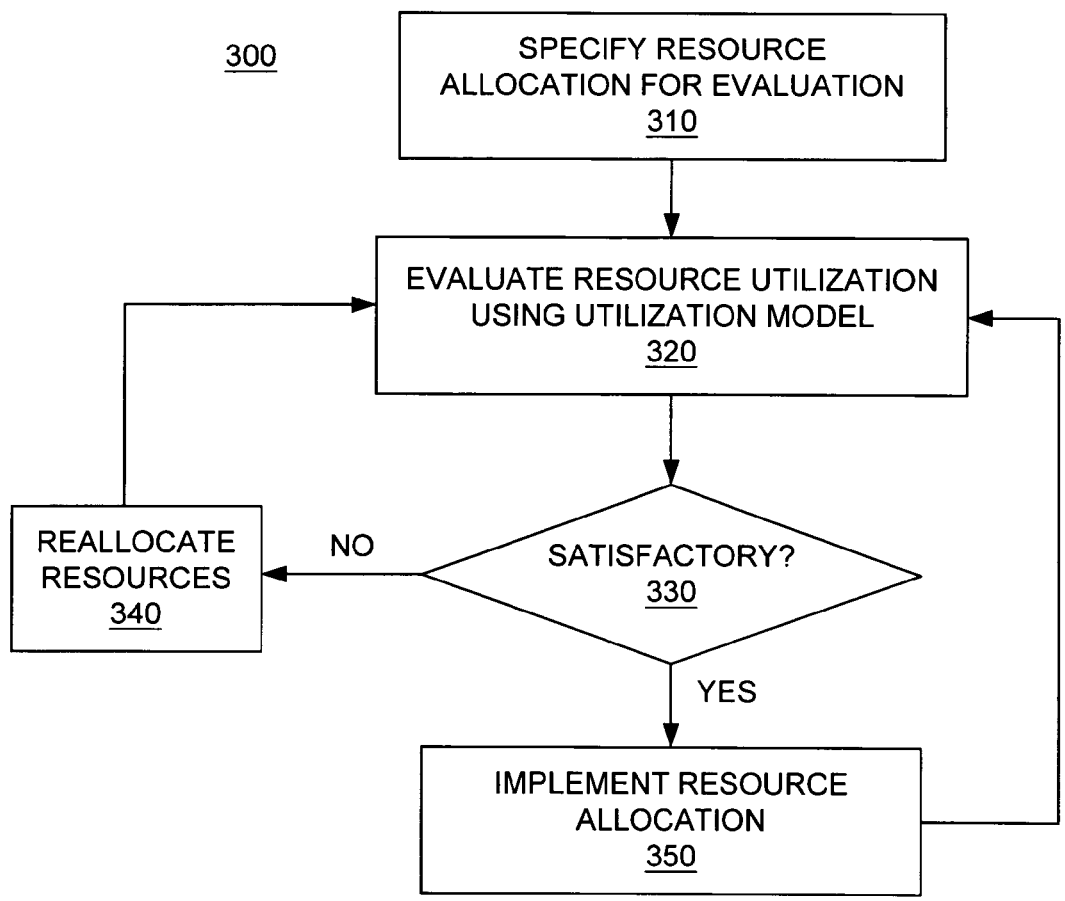
FIG. 3 is a flowchart that describes the use of a utilization model to evaluate a system according to one embodiment of the present invention.

FIG. 3 is a flowchart 300 that describes the application of a utilization model to a system evaluation according to one embodiment of the present invention. Although specific steps are disclosed in flowchart 300, such steps are exemplary. That is, embodiments of the present invention are well suited to performing various other steps or variations of the steps recited in flowchart 300. It is appreciated that the steps in flowchart 300 may be performed in an order different than presented, and that not all of the steps in flowchart 300 may be performed.

In block 310, in the present embodiment, the resource allocation to be evaluated is specified. The resource allocation is typically subject to specified system and business rules. This resource allocation can be an initial (e.g., assumed) resource allocation (a starting point for the evaluation), or for an intermediate state for a system design, or for an operational system (e.g., a final state for a system design).

In block 320, in the present embodiment, the resource allocation of block 310 is evaluated using a utilization model such as that described above in conjunction with FIG. 2. The outcome of block 320 is a measure of resource utilization. System utilization can be measured on an overall system basis, or the utilization of each component in the system can be measured.

In block 330 of FIG. 3, in the present embodiment, the measure of resource utilization from block 320 is compared against one or more selected performance metrics. If the measure of resource utilization is not satisfactory, then flowchart 300 proceeds to block 340; otherwise, flowchart 300 proceeds to block 350.

In block 340, in the present embodiment, resources are reallocated (e.g., the system is reconfigured). In one embodiment, linear programming is used to optimize the resource allocation against the metrics and under particular constraints. System and business rules can be applied to constrain the resource reallocation. The reallocation of resources can be an automatic process enforced according to the system and business rules, or it can be a manual process performed by the system designer or system operator. From block 340, flowchart 300 returns to block 320 for evaluation of the new resource allocation.

In block 350, in the present embodiment, the resource allocation that satisfies the selected performance metric(s) is implemented. At periodic intervals, the resource allocation can be re-evaluated to determine if resource utilization remains satisfactory. If so, operation continues according to that resource allocation; otherwise, flowchart 300 returns to block 340, as described above.

Re-evaluation of the resource allocation can occur at programmed intervals, or it can occur in response to some type of trigger. For example, actual system performance can be measured against predicted system performance. As another example, the basis for the system evaluation can be compared to actual conditions experienced by the system. For instance, a higher (or lower) than expected number of user requests can trigger a re-evaluation.

When triggered, the system utilization model can be automatically invoked. Alternatively, an alert can be made to the system designer or system operator, indicating that execution of the system utilization model would be appropriate. New resource allocations, configured according to the system and business rules in place, can then be evaluated. The new resource allocation can then be implemented, either automatically or subject to approval of a system designer/operator. It is conceivable that procurement of additional resources can also be accomplished automatically.

The discussion above describes one use for the utilization model 250 of FIG. 2. The utilization model 250 can be applied in other ways as well. Each of the inputs to the utilization model 250 can be perturbed, individually or in various combinations, to assess the impact on resource utilization. For example, the workflow model 252, the process model 254, and/or the input model 256 can be perturbed to determine the impact on resource utilization. That is, for a given resource allocation, limitations on workflow, processes (including third party processes), inputs, and system and business rules can be identified. In a similar manner, for a given resource allocation, the utilization model 250 can be applied regressively to establish new workflow, processes (including third party processes), inputs, system rules and business rules, or to modify existing ones.

FIG. 4 is a flowchart 400 of a process for evaluating the utilization of resources in a system in accordance with one embodiment of the present invention. Although specific steps are disclosed in flowchart 400, such steps are exemplary. That is, embodiments of the present invention are well suited to performing various other steps or variations of the steps recited in flowchart 400. It is appreciated that the steps in flowchart 400 may be performed in an order different than presented, and that not all of the steps in flowchart 400 may be performed. All of, or a portion of, the methods described by flowchart 400 may be implemented using computer-readable and computer-executable instructions which reside, for example, in computer-usable media of a computer system or like device.

In block 410 of FIG. 4, in the present embodiment, information is received that characterizes the allocation of resources in a system.

In block 420, in the present embodiment, information characterizing the requests (e.g., user inputs) into the system is received.

In block 430, in the present embodiment, workflow in the system is simulated. That is, for example, the software architecture supported by the system is modeled (e.g., by workflow model 252 of FIG. 2).

In block 440 of FIG. 4, in the present embodiment, processes executed by the system are modeled (e.g., by process model 254 of FIG. 2).

In block 450 of FIG. 4, in the present embodiment, the utilization of the system resources is determined (e.g., by utilization predictor model 260 of FIG. 2).

In block 460 of FIG. 4, in the present embodiment, resources are reallocated to improve resource utilization, as measured by one or more performance metrics.

In summary, embodiments of the present invention provide methods and systems thereof for evaluating and allocating resources to improve resource utilization. The embodiments of the present invention provide to system designers and operators an overall perspective of the flow of work, from inputs to processes and from processes to system resources that implement the processes. The overall process is thus translated onto the resources supporting the overall process. In its various embodiments, the present invention is useful for making sure that sufficient resources are available to support the expected workload without allocating more resources than are necessary.

Various embodiments of the present invention are thus described. While the present invention has been described in particular embodiments, it should be appreciated that the present invention should not be construed as limited by such embodiments, but rather construed according to the following claims.

What is claimed is:

1. A method for evaluating the utilization of resources in a system, said method comprising:
    receiving first information that characterizes a proposed first allocation of resources in said system;
    receiving second information that characterizes predicted requests to said system;
    using a predictor model to determine a first expected utilization for said proposed first allocation of resources in response to said predicted requests;
    specifying a proposed second allocation of said resources and using said predictor model to determine a second expected utilization for said proposed second allocation in response to said predicted requests; and
    selecting an allocation of said resources that improves utilization of said system as measured against a selected performance metric.

2. The method of claim 1 wherein using said predictor model comprises:
    simulating workflow in said system in response to said requests; and
    simulating processes that are executed by said system in response to said requests.

3. The method of claim 1 wherein said first information is selected from the group of information consisting of the number of computers in said system, attributes of said computers, memory capacity available to said system, and bandwidth capacity of said system.

4. The method of claim 1 wherein said second information is selected from the group of information consisting of a distribution of types and a distribution of frequency of said requests.

5. The method of claim 4 further comprising:
using different distributions of requests in said predictor model.

6. The method of claim 1 further comprising:
evaluating resource allocations that are different from said first allocation and said second allocation.

7. The method of claim 6 further comprising:
determining consequences associated with each resource allocation that is evaluated.

8. The method of claim 6 further comprising:
configuring said system according to a resource allocation selected from resource allocations that are evaluated.

9. The method of claim 8 wherein said configuring is performed automatically.

10. The method of claim 1 wherein a model of said system is derived from source code of selected system resources.

11. The method of claim 1 wherein a model of said system is derived from evaluating execution of selected system resources and regressing to said predictor model based on said evaluating.

12. The method of claim 1 wherein a model of said system is derived from empirical information.

13. A computer system comprising:
a memory unit; and
a processor coupled to said memory unit, said processor for executing a method for deploying resources in a system, said method comprising:
inputting first and second information into a predictor model, said first information describing a first proposed deployment of resources in said system and said second information describing requests to said system;
using said predictor model to predict utilization of said first proposed deployment of resources; and
deploying said resources in said system differently to increase said utilization as measured against a selected performance metric.

14. The computer system of claim 13 using said predictor model comprises:
mapping said requests to processes used to respond to said requests; and
determining an expected utilization of said first deployment of resources according to a model of said processes.

15. The computer system of claim 13 wherein said first information is selected from the group of information consisting of the number of computers in said system, attributes of said computers, memory capacity available to said system, and bandwidth capacity of said system.

16. The computer system of claim 13 wherein said second information is selected from the group of information consisting of a distribution of types and a distribution of frequency of said requests.

17. The computer system of claim 16 wherein different distributions of requests are used in said predictor model, said predictor model used to predict utilization of said first proposed deployment of resources for each of said different distributions.

18. The computer system of claim 13 wherein said method further comprises:
determining utilization of resource deployments that are different from said first proposed deployment of resources.

19. The computer system of claim 18 wherein said method further comprises:
identifying which of said resource deployments satisfy said selected performance metric.

20. The computer system of claim 18 wherein said method further comprises:
identifying consequences associated with each of said resource deployments.

21. The computer system of claim 18 wherein said method further comprises:
deploying said resources in a configuration selected from said resource deployments.

22. The computer system of claim 21 wherein said deploying is performed automatically.

23. A computer-usable medium having computer-readable program code embodied therein for causing a computer system to perform a method for evaluating the allocation of resources in a system, said method comprising:
reading first information that describes a proposed first allocation of resources in said system;
reading second information that describes predicted requests to said system;
applying a predictor model to said first and second information, wherein said model calculates parameters that quantify a first expected utilization of said proposed first allocation of resources;
reading third information that describes a proposed second allocation of said resources;
applying said predictor model to said second and third information to calculate parameters that quantify a second expected utilization of said proposed second allocation of resources; and
selecting one of said proposed first and second allocations according to which of said first and second expected utilizations is higher.

24. The computer-usable medium of claim 23 wherein said model calculates said parameters according to a simulation of system response to said requests and according to a simulation of processes that are executed by said system in response to said requests.

25. The computer-usable medium of claim 23 wherein said first information is selected from the group of information consisting of the number of computers in said system, attributes of said computers, memory capacity available to said system, and bandwidth capacity of said system.

26. The computer-usable medium of claim 23 wherein said second information is selected from the group of information consisting of a distribution of types and a distribution of frequency of said requests.

27. The computer-usable medium of claim 26 wherein said computer-readable program code embodied therein causes a computer system to perform a method for evaluating the allocation of resources in a system, said method comprising:
using different distributions of requests in said predictor model.

28. The computer-usable medium of claim 23 wherein said computer-readable program code embodied therein causes a computer system to perform a method for evaluating the allocation of resources in a system, said method comprising:
calculating said parameters for resource allocations that are different from said proposed first allocation and said proposed second allocation.

29. The computer-usable medium of claim 28 wherein said computer-readable program code embodied therein causes a computer system to perform a method for evaluating the allocation of resources in a system, said method comprising:

comparing said parameters against respective metrics.

30. The computer-usable medium of claim 28 wherein said computer-readable program code embodied therein causes a computer system to perform a method for evaluating the allocation of resources in a system, said method comprising:

identifying consequences associated with each of the different resource allocations.

31. The computer-usable medium of claim 28 wherein said computer-readable program code embodied therein causes a computer system to perform a method for evaluating the allocation of resources in a system, said method comprising:

configuring said system according to a resource allocation selected from the different resource allocations.

32. The computer-usable medium of claim 31 wherein said configuring is performed automatically.

* * * * *